United States Patent
Smith

(10) Patent No.: US 8,080,972 B2
(45) Date of Patent: Dec. 20, 2011

(54) SYSTEM AND METHOD FOR STORING AND RELEASING ENERGY

(75) Inventor: David S. Smith, Woodland Hills, UT (US)

(73) Assignee: Goal Zero LLC, Bluffdale, UT (US)

( * ) Notice: Subject to any disclaimer, the term of this patent is extended or adjusted under 35 U.S.C. 154(b) by 291 days.

(21) Appl. No.: 12/477,085

(22) Filed: Jun. 2, 2009

(65) Prior Publication Data

US 2010/0102772 A1    Apr. 29, 2010

Related U.S. Application Data

(60) Provisional application No. 61/058,109, filed on Jun. 2, 2008.

(51) Int. Cl.
*H01M 10/46* (2006.01)
*H02J 7/00* (2006.01)

(52) U.S. Cl. .................. 320/101; 320/107; 320/134

(58) Field of Classification Search .................. 320/101, 320/134, 107
See application file for complete search history.

(56) References Cited

U.S. PATENT DOCUMENTS

| 5,084,664 | A | 1/1992 | Gali | |
|---|---|---|---|---|
| 5,525,888 | A * | 6/1996 | Toya | 320/111 |
| 6,218,807 | B1 * | 4/2001 | Sakaue et al. | 320/107 |
| 6,346,793 | B1 * | 2/2002 | Shibata et al. | 320/113 |
| 2003/0090234 | A1 | 5/2003 | Glasgow et al. | |

OTHER PUBLICATIONS

International Search Report for PCT/US09/46025 date Jul. 14, 2009.

* cited by examiner

*Primary Examiner* — Reena Aurora
(74) *Attorney, Agent, or Firm* — Foley & Lardner LLP

(57) ABSTRACT

A power system includes a housing having a base and a handle, a battery; a charge controller, and an inverter. The power system further includes a chimney-like venting system for cooling the power system. The chimney venting system may have at least one opening near said base and at least one opening near said handle.

16 Claims, 5 Drawing Sheets

SYSTEM AND METHOD FOR STORING AND RELEASING ENERGY

CROSS REFERENCE TO RELATED APPLICATIONS

This application claims priority under 35 USC 119(e) to U.S. Provisional Patent Application No. 61/058,109 filed on Jun. 2, 2008, titled "System and Method for Storing and Releasing Energy", to David D. Smith, the contents of which are incorporated in their entirety herein by reference.

FIELD OF THE INVENTION

The disclosure relates to a system and method for storing and releasing energy, and in particular to a system and method that uses a portable system including a battery for energy storage.

BACKGROUND

As electronics technology is becoming portable, power systems may also be needed when access to wire-line voltage is unavailable. However, many portable power systems are difficult to carry, and also may not provide continued power when away from wire-line voltages for extended periods of time. Moreover, existing battery power systems are not amenable to outdoor usage.

Thus, a need exists for a portable power system that is easy to carry and may be charged with or without wire-line voltage being accessible.

BRIEF DESCRIPTION OF THE DRAWINGS

The disclosure will now be described, by way of example, with reference to the accompanying drawings, in which.

DETAILED DESCRIPTION OF THE INVENTION

Figure 1:
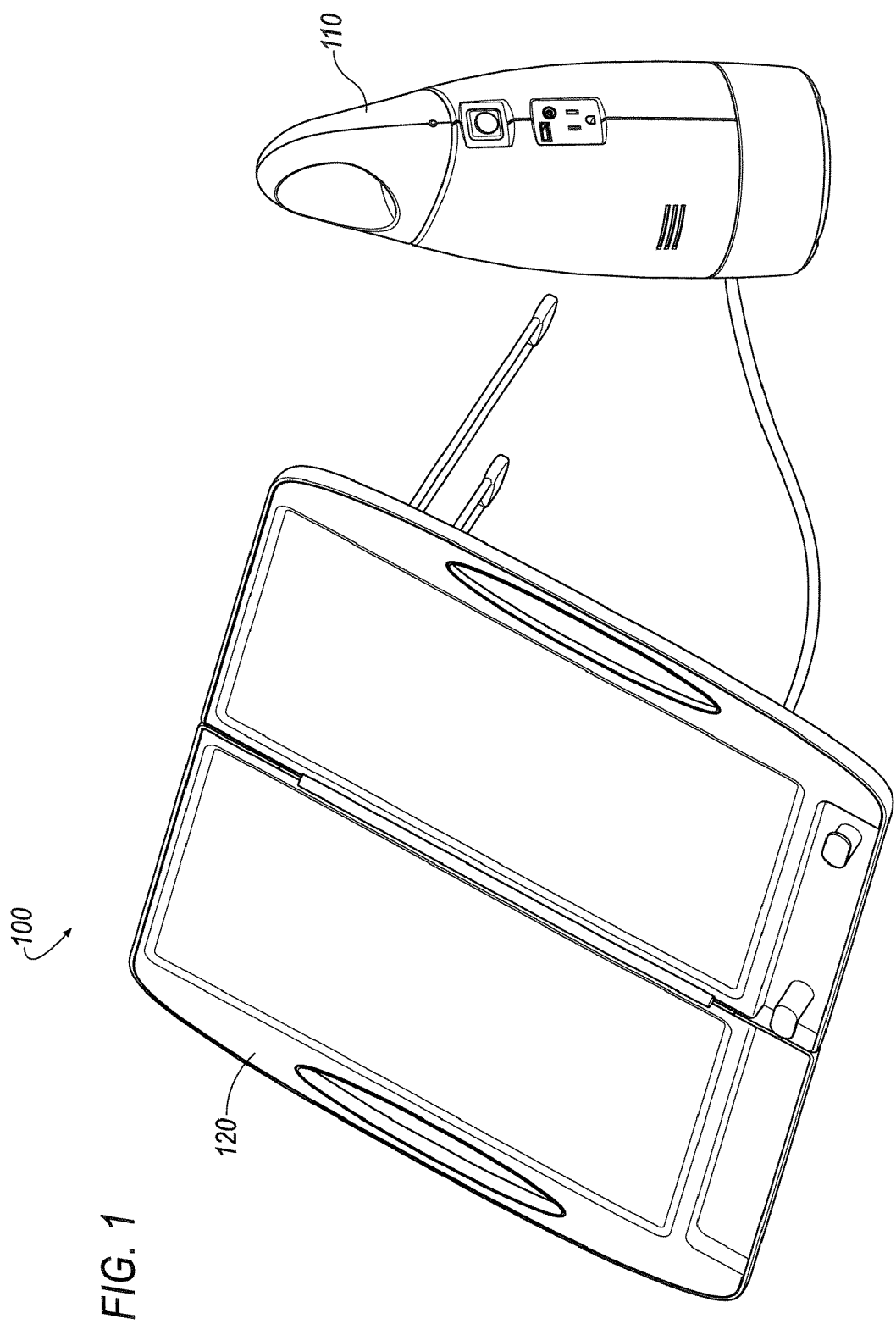
FIG. 1 is a perspective view of a system and method for storing and releasing energy including a power unit and a solar panel.

The Figures illustrate an exemplary embodiment of a system and method for storing and releasing energy. Based on the foregoing, it is to be generally understood that the nomenclature used herein is simply for convenience and the terms used to describe examples of the system and method and should be given the broadest meaning by one of ordinary skill in the art. This application claims priority under 35 USC 119(e) to U.S. Provisional Patent Application No. 61/058,109 filed on Jun. 2, 2008, titled "System and Method for Storing and Releasing Energy", to David D. Smith, the contents of which are incorporated in their entirety herein by reference.

The system and method for storing and releasing energy may be, in an example, configured as a portable battery unit that can be charged/recharged with an included solar panel assembly or the AC adapter that plugs into an ordinary AC wall outlet. The product may be used to charge electronic devices that use rechargeable batteries, and also act as a portable power source for electronics. The portable system may be used for power tools, hunting, camping, and home back-up power. The system is also compatible with generic electronic products, such as, cell phones, PDAs, laptops, radios, and portable coolers.

Versions of the system may include a portable battery unit is rated at around 7 amps, and an inverter contained inside rated at around 120V/60 Hz/80 watts (200 watts peak). One example of a battery would be a 12 Volt/14.5 amp hour battery. The battery capacity, size and weight may change as battery technology improves. Common solar panels may be rated at 12VDC/13 watts. Both of the battery and solar panel may be updated per the availability of improved components. Depending upon the application (e.g., construction job site vs. portable music), the system may contain different voltage, amps and wattage requirements depending on the application. Certain consumer electronics applications may include a USB output that consumers can plug their electronic devices (PDA's, cell phones, etc) into for power or to recharge their devices battery.

Some examples of uses for the system may include tool recharging, device charging, or directly powering electronic devices when AC power is limited or unavailable. For example, this could include using AC devices outdoors, or in large meetings (e.g., powering the Cricut at a scrapbook meeting). The system can be used either inside the home or outdoors. Examples include recharging camera or camcorder batteries, powering laptops, AM/FM radios, personal fans, lights, small televisions, and portable CD/DVD players.

The system can also be used for home or auto emergencies. For example, the system can be used as a standby power source for communication devices, such as cordless phones. The 12 volt power can be fed into the cigarette lighter of a vehicle providing boost capacity in case of a discharged car battery. Such applications allow for emergency preparedness companies. Moreover, the system can be used for non-emergency situations without modification. That is, the system is user friendly to the family as a whole and can go from the garage to the home without difficulty.

On a construction job site, the workers may charge their cell phones, two-way radios, and other rechargeable battery powered devices on site without having to turn their car/truck batteries on, which at times requires the keys to be left in the ignition.

In general, and as described below in detail, the system and method for storing and releasing energy may include a number of features. These may include, as described above, that the inverter and charger controller are stacked. Moreover, the chimney venting scheme provides holes near the bottom of the power unit to let cool air in, passing by the battery, passing by the inverter and controller, passing by the heat sink, and exiting near the top. The heat sink may be "L" shaped, aluminum, and attaches to the power regulators and or power devices of the inverter and/or charger controller. The heat sink functions to cool the inverter and charger controller via the chimney venting, as well as separating the controller and inverter to reduce EMF/EMC/EMI therebetween (or to the outside). The base may hold the battery, and may also include a high-density poly foam insert to absorb impacts if the power unit is dropped or repeatedly placed in a high-g manner.

FIG. 1 is a perspective view of a system and method for storing and releasing energy 100 including a power unit 110 and a solar panel 120. The solar panel 120 is generally foldable at the mid-point and includes a prop-stand to allow the user to place the solar panel at an advantageous location relative to the sun. The solar panel may also include an integrated carrying handle and a charging cord coiling station to keep the charging cord in place when being transported.

The power unit 110 includes carry handle and a slender design having the weight primarily located near the bottom of the power unit for easy carrying and balance. The solar panel power cord plugs into the power unit 110 to provide electricity for charging. As described below, the power unit 110 may also be charged through a variety of other methods as well. The power unit may be configured as an injection molded anti-UV ABS case, with rubber handle attachments. The solar panel 120 may be specified as, for example, a 13 watt 12 volt solar module, but may have variations in style and power outputs depending upon design criteria.

Figures 2, 3:
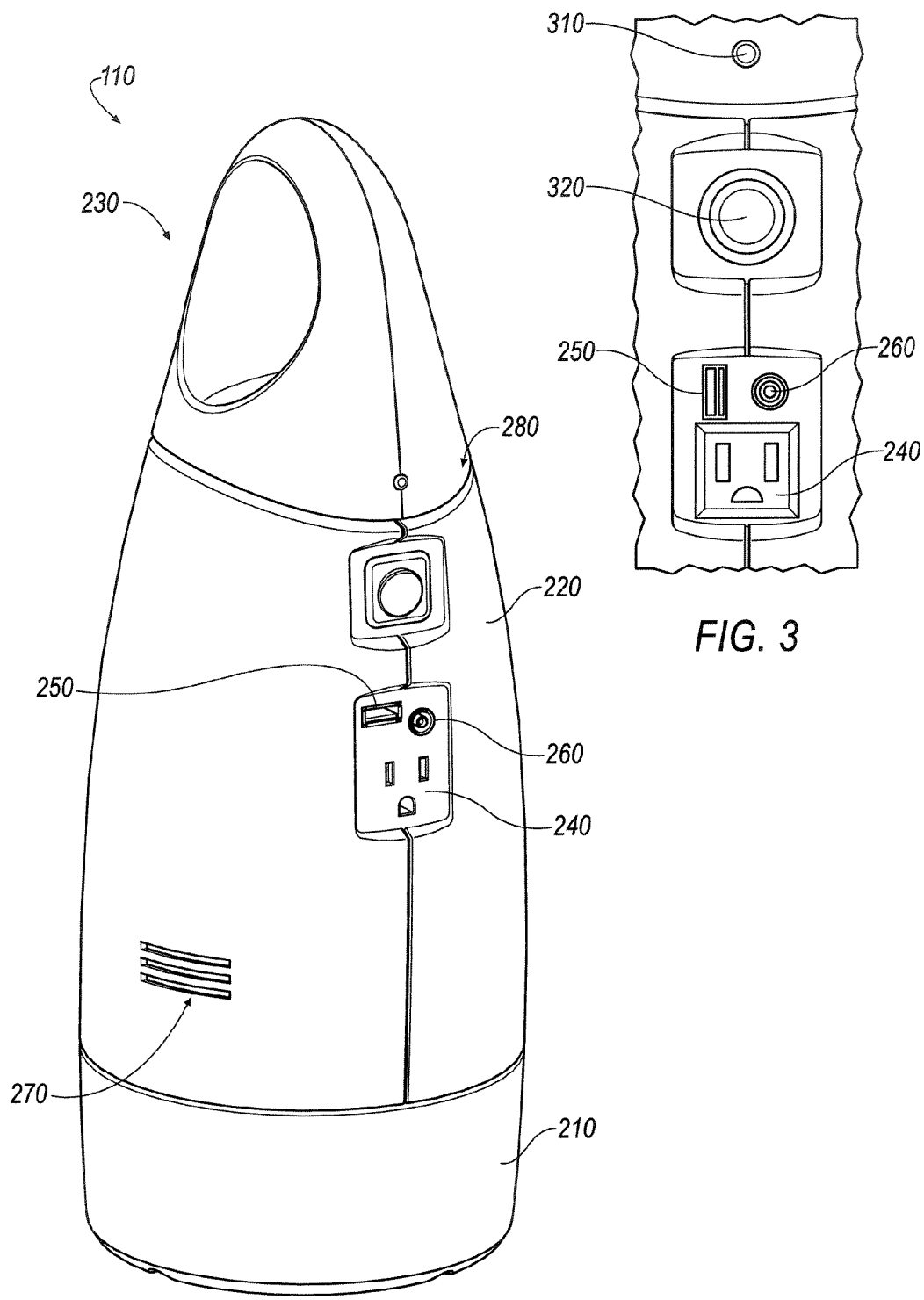
FIG. 2 is a perspective view of a power unit for use with the system of FIG. 1.
FIG. 3 is a close-up front view of the user interface for the power unit of FIG. 2.

FIG. 2 is a perspective view of a power unit 110 for use with the system of FIG. 1. In general, the power unit 110 includes a comfort carry handle 230, a 110 Volt AC output 240, a 12 DC output 260, and a USB port for out-board charging 250. The power unit 110 may also include an LED for the inverter status (e.g., on/off), multiple light emitting diodes (LED's) to indicate the charge status of the battery to a user, a Solar/Wall Adapter DC input (e.g., 14.8 Volt DC), and a 14.5 Amp Hr Absorbed Glass Mat (AGM) battery. The specifications of the input/output systems as well as the indicators may change per design requirements. Thus, the specific wattages and configuration are described herein as examples. Moreover, other battery technologies may be used to achieve higher power densities, as well as improved temperature performance, depending on where the power unit 110 will be used.

FIG. 3 is a close-up front view of the user interface for the power unit 110 of FIG. 2. The user interface may include a LED Charge Status indicator which may include three LEDs located on the side of the power unit 110 below the carry handle. In a first mode, the first LED may display red when the battery status is below the recommended values for the battery, this indicated when the charge controller is in a Low Voltage Disconnect (LVD) mode. No power will be supplied to the 12 volt system 260, USB system 250, or inverter output 240 in this condition. In a second mode, the second LED displays yellow when the battery is in a low voltage condition. In this condition it is recommended that the battery be recharged for best performance. In a third condition, the third LED displays Green when the battery is in a full charged condition.

A Charge Status LED 310 is generally shown in FIG. 3 as a single LED above the user interface/input output area. The Charge Status LED 310 displays green when inverter switch in the on position and battery voltage and current is sufficient to supply power to an inverter to produce 110 volts AC at inverter output 240, 12 volt system 260, and 5 volts DC to USB connector 250.

Cables and connectors provide the means for supplying power to and from the power unit include a USB Standard Type A connector 250. The connector may include no data pins, but includes pins one (1) and four (4) for providing 5 VDC 500 ma max. The USB specification provides a 5 VDC supply on a single pair of wires from which connected USB devices may draw power. The specification provides for no more than 5.25 V and no less than 4.75 V (5 V±5%) between the positive and negative bus power lines. Initially, a device is only allowed to draw 100 mA. It may request more current from the upstream device in units of 2 mA up to a maximum of 500 mA. Note that although a USB connecter is discussed herein, any other type of connector useful for providing power to electronic devices may also be used.

The connectors may also include a 2.4 mm or 3.5 mm coaxial power connector, which may be connected to the solar panel via a standard cable (e.g., a PCMC EIAJ-04 for 10.5-13.5 V), and a standard 110 VAC wall adapter. However, depending upon the market for sale, the power unit may include different voltage ratings and connector types to suit the applicable country standards, or it may contain more than one standard plug and power type.

Figure 4:
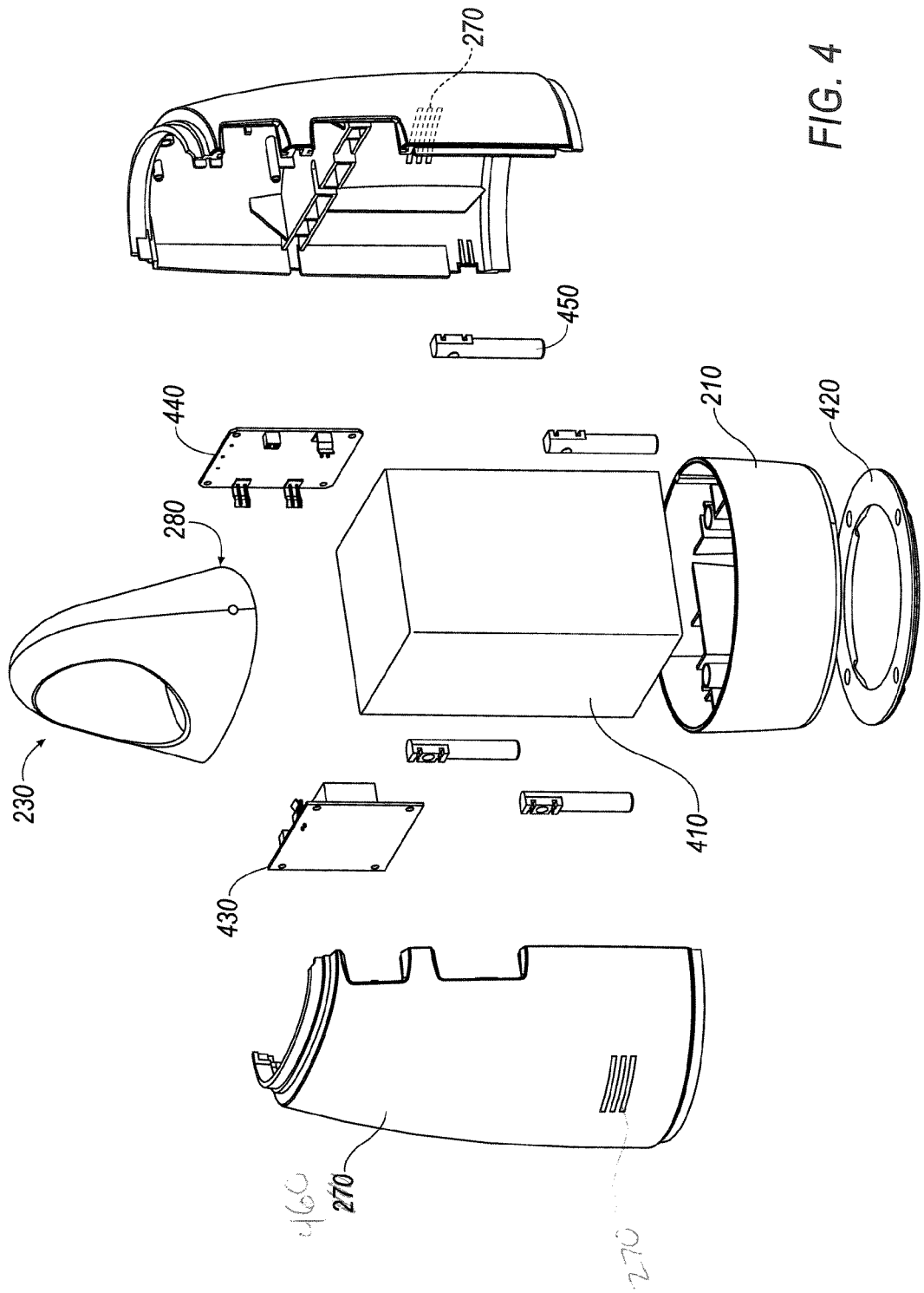
FIG. 4 is an exploded front view of the power unit of FIG. 2.

FIG. 4 is an exploded front view of the power unit 110 of FIG. 2. In general, power unit 110 internally carries a battery 410, an inverter module 430, and a charger module 440. The inverter module 430 converts the battery 410 power to the 110 VAC for consumption by the user. The charger module receives input from either the solar panel 120 (see FIG. 1) or a power receptacle to charge the battery 410.

The charger module 440 may include a pulse-width modulated system having an input of around 12 VDC to about 17.5 VDC. The output power may be about 100 watts, and may include low voltage, overload, short circuit, and temperature protected. The charger module 440 may be connected to the battery for both charging and monitoring needs. For example, the charger module 440 may control the status of the LED Charge Status indicators (e.g., Green LED for Charge/Float indication, Red LED for LVD indication, Yellow LED for Low-Voltage indication). The charger module 440 as described herein is only an example of how to implement a charge controller and is not limiting to the present implementation.

The inverter module 430 may include a modified sine wave output, at about 80 Watts and may include high voltage protection, low voltage protection, overload protection, short circuit protection, and high temperature protection. The input voltages may be from different sources and may include a 12VDC input as well as a 110 VAC input. The inverter may also provide the 5VDC USB output.

The case includes a base 210 having a shock absorber 420, a handle 230 having an upper vent area 280, and an outer an outer case 460 having lower vents 270. The base may be provided as a shock resistant material, and also a strong material to withstand the abuse of dropping the power unit 110 onto a hard surface. Moreover, the base may include cushioning materials to cushion the battery if the power unit 110 is dropped. The shock absorber 420 may be configured as a hard plastic that absorbs abuse when the power unit 110 is placed on a hard surface or dropped. The shock absorber 420 may also be configured as a user-replaceable item if broken.

Internally, the power unit may also have load-transferring features such as posts 450 that attach the base 210 to the outer case 460. Additional load-transferring shown in FIG. 5 may also provide a solid attachment from handle 230 to outer case 460. In this way, the load is carried from the base 210 (that holds the weight of the battery) solidly through to the handle 230.

Figure 5:
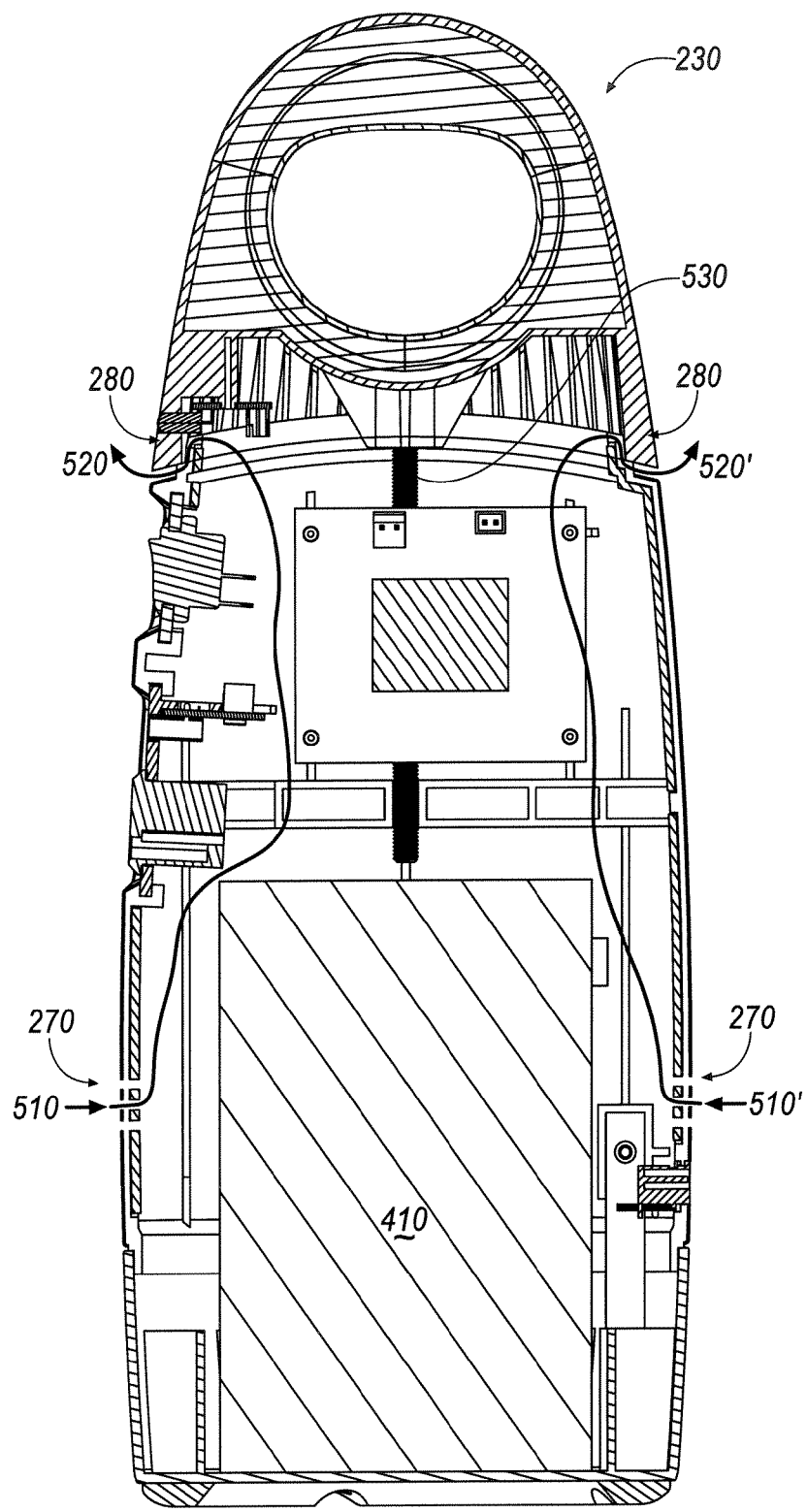
FIG. 5 is a cross-sectional view of the power unit of FIG. 2.

FIG. 5 is a cross-sectional view of the power unit 110 of FIG. 2 showing the positioning of the inverter, heat sink and charger controller for use with chimney venting. The power unit 110 includes the inverter module 430 and charger module 440, located above the battery 410. The user interface, switches, and connectors are operably connected to the inverter and charging system for use. The power unit includes abuse, a ring stand, two housing sides, and a top handle. For ventilation or the battery, inverter, and charger, airflow is designed to provide a chimney effect to cool the internal components. In one example, the base includes air openings 520 near the outer perimeter or on the bottom. As the internal components heat up, air is pulled 510, 510' in through the bottom vents 270, moves over the battery 410, and around and between the inverter and charger. The heated air then exits 520 at vents 280 near the bottom of the handle 230. As shown in FIG. 2, the upper vents 280 are on the outside of the case.

Thus, when the user is carrying the power unit 110, the hot air is not vented to the carrying handle.

In addition, the power unit may include a multi-purpose heat sink positioned between the inverter and charger that may provide for increased efficiency of the chimney venting to take away the heat from inverter module 430 and charger module 440. The multi-purpose heat sink may be attached to the inverter and charger power components and may include fins or other means to carry away heat. Moreover, the multi-purpose heat sink may also provide electromagnetic shielding between the inverter and charger to reduce interference to each other, as well as outside the power unit.

Figure 6:
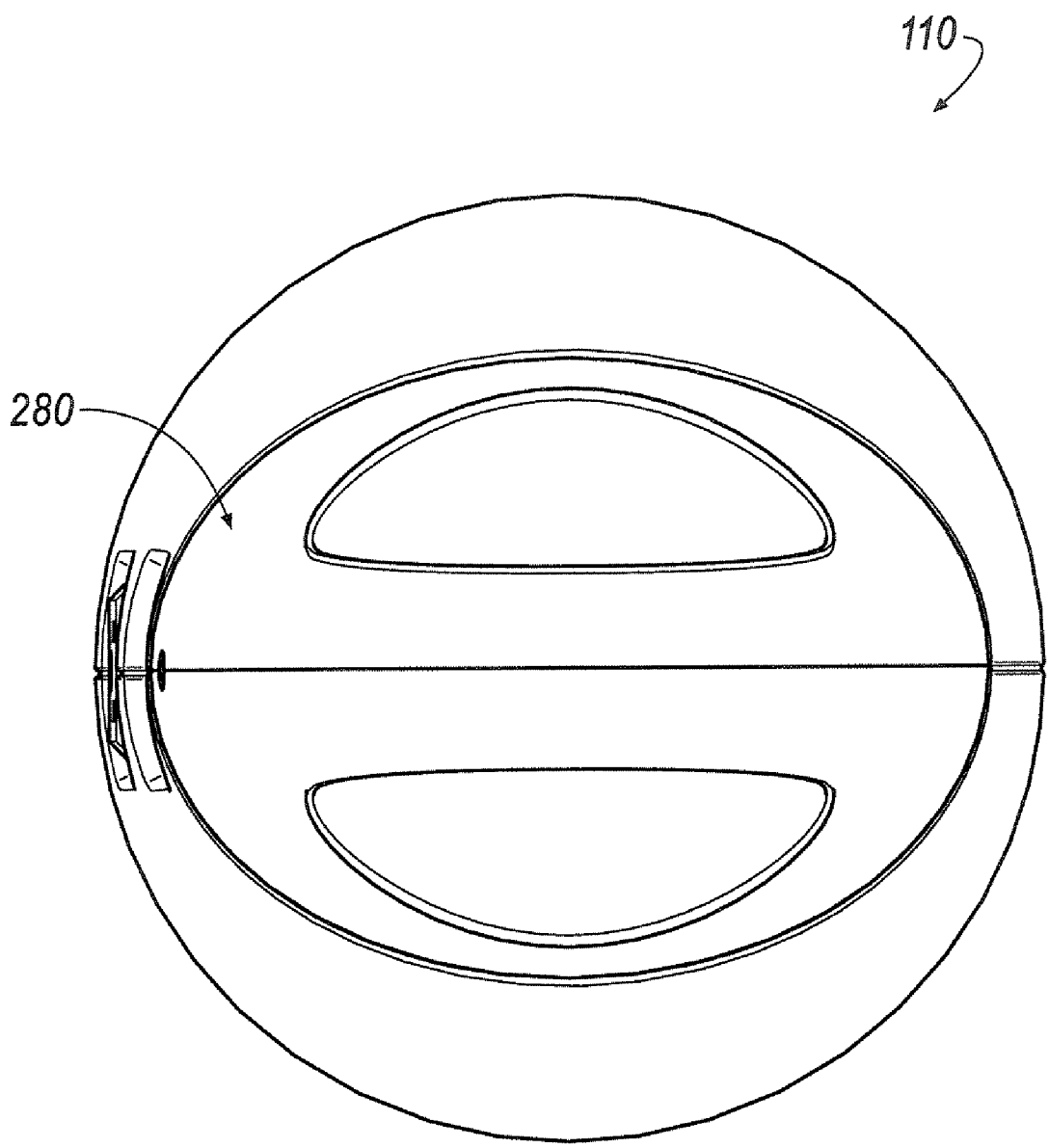
FIG. 6 is s top view including a carry handle of the power unit of FIG. 2.

FIG. 6 is s top view including a carry handle of the power unit 110 of FIG. 2. The upper vents 280 are concealed between the carrying handle 230 and the case 460 (see FIG. 4). The chimney venting takes air in at the bottom vents 270 (see FIGS. 4 and 5) shown as air inlets at the bottom of the power unit, and internally the air passes over the components finding air paths between the battery and the outer casing, and leading up to the inverter and charger controller. The air then vents out the top of the power unit near the bottom of the handle which reduces any heat applied to the portion of the handle that the user would grip.

The handle is designed to be easy for a user to carry the power unit over distance. Moreover, as shown by the top view, the power unit is designed so that a user may carry the power unit with their aim extended (reducing fatigue). The power unit is also designed as a slender device so that the user can carry the power unit with their fully extended and not have to be concerned about bumping the power unit into their legs or other objects while transporting it. As shown by the slats around the perimeter of the hand-grip region, the power unit includes openings at the top of the main body that provide for the chimney-venting air exit.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A system, comprising:
   a cylindrically-tapered housing having a base proximate a lower end and a handle proximate an upper end;
   a battery supported on the base and disposed within the cylindrical housing so that a first air space is defined between an outer surface of the battery and an inner surface of the cylindrical housing;
   a charge controller disposed within the cylindrically-tapered housing above the battery so that a second air space is defined between an outer surface of the charge controller and the inner surface of the cylindrically-tapered housing;
   an inverter disposed within the cylindrically-tapered housing above the battery so that a third air space is defined between an outer surface of the inverter and the inner surface of the cylindrically-tapered housing; and
   a chimney venting system for cooling said system, said chimney venting system configured to draw a supply of ambient air along an airflow path defined at least partially by at least one lower opening near said base, and the first air space proximate the battery, and the second air space proximate the charge controller, and the third air space proximate the inverter, and at least one upper opening near said handle.

2. The system of claim 1, further comprising: a solar panel for charging said battery.

3. The system of claim 1, further comprising: a heat sink positioned between said charger controller and inverter.

4. The system of claim 1, further comprising: a shock absorption means for cushioning said battery.

5. The system of claim 1, wherein the cylindrically-tapered housing is at least partially tapered from the lower end toward the upper end.

6. The system of claim 1, wherein the at least one upper opening is disposed beneath the handle and is at least partially concealed by the handle.

7. A system, comprising:
   a substantially cylindrical housing having a uniformly tapered profile extending at least partially from a base portion proximate a lower end of the housing toward a handle portion proximate an upper end of the housing;
   a battery supported on the base portion and disposed within the cylindrical housing so that a first air space is defined around the battery and within the cylindrical housing;
   a shock absorber operably coupled between the base portion and the battery;
   a charge controller and an inverter disposed within the cylindrical housing above the battery so that a second air space is defined around the charge controller and the inverter and within the cylindrical housing;
   a heat sink disposed at least partially between the charger controller and the inverter, and in communication with the second air space;
   a venting system for cooling the battery and the charge controller and the inverter and the heat sink, the venting system configured to draw a supply of ambient air from outside of the housing along an airflow path defined at least partially by at least one lower air-entrance opening proximate the lower end of the housing, and the first air space proximate the battery, and the second air space proximate the charge controller and the inverter, and at least one upper air-exit opening proximate the upper end of the housing.

8. The system of claim 7, wherein the at least one upper air-exit opening is disposed beneath the handle portion and is at least partially concealed by the handle portion.

9. The system of claim 8, wherein the at least one upper air-exit opening is defined at least partially by a junction beneath the handle portion and the housing.

10. The system of claim 9, wherein the at least one upper air-exit opening is configured to direct the supply of ambient air flowing along the airflow path in a direction away from the handle portion.

11. The system of claim 7, wherein the shock absorber comprises a user-replaceable item if broken.

12. The system of claim 7, further comprising a first load transferring post coupled to the base portion and the lower end of the housing.

13. The system of claim 12, further comprising a second load transferring post coupled to the handle portion and the upper end of the housing.

14. The system of claim 7, wherein the tapered profile of the cylindrical housing is configured to facilitate a chimney effect for the supply of ambient air flowing along the airflow path.

15. The system of claim 7, wherein the heat sink is configured to provide electromagnetic shielding between the inverter and the charge controller.

16. The system of claim 15, wherein the heat sink is substantially L-shaped and comprises a plurality of fins exposed to the second air space.

\* \* \* \* \*